(12) United States Patent
Watanabe et al.

(10) Patent No.: US 6,492,058 B1
(45) Date of Patent: Dec. 10, 2002

(54) BATTERY PACK

(75) Inventors: Atsushi Watanabe, Tsuna-gun (JP); Yasushi Inoue, Sijonawate (JP); Ryosuke Kubo, Mihara-gun (JP); Keiji Ishihama, Sumoto (JP); Yasuhiro Yamagami, Tsuna-gun (JP); Takuya Matsuda, Tsuna-gun (JP); Mikitaka Tamai, Tsuna-gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/512,334

(22) Filed: Feb. 24, 2000

(30) Foreign Application Priority Data

Feb. 26, 1999 (JP) .......................... 11-049818
Mar. 31, 1999 (JP) .......................... 11-091624

(51) Int. Cl.$^7$ ............................. H01M 10/02
(52) U.S. Cl. ................... 429/121; 429/123
(58) Field of Search .................. 429/7, 121, 122, 429/123, 124, 125

(56) References Cited

U.S. PATENT DOCUMENTS

| | | | | |
|---|---|---|---|---|
| 5,102,753 A | * | 4/1992 | Rossoll et al. | 429/192 |
| 5,459,388 A | * | 10/1995 | Illingworth et al. | 320/2 |
| 5,545,491 A | * | 8/1996 | Farley | 429/7 |
| 5,573,869 A | * | 11/1996 | Hwang et al. | 429/91 |
| 6,218,041 B1 | * | 4/2001 | Barbier et al. | 429/96 |

FOREIGN PATENT DOCUMENTS

| | | |
|---|---|---|
| JP | 8-31460 | 2/1996 |
| JP | 8-329913 | 12/1996 |

* cited by examiner

*Primary Examiner*—Patrick Ryan
*Assistant Examiner*—M. Wills
(74) *Attorney, Agent, or Firm*—Wenderoth, Lind & Ponack, L.L.P.

(57) ABSTRACT

The battery pack houses a protection circuit along with a rechargeable cell in a case. The protection circuit is provided with switching devices to control current flow in the rechargeable cell, and a control circuit to control the switching devices. The protection circuit is molded in a single package with insulating material to make a one-package unit. The one-package unit is retained in a holding space in an insulating holder. The one-package unit, insulating holder, and rechargeable cell are held in the case.

22 Claims, 8 Drawing Sheets

BATTERY PACK

This application is based on applications No. 11-49818 filed in Japan on Feb. 26, 1999 and No. 11-91624 filed on Mar. 31, 1999, the contents of which are incorporated herein by reference.

BACKGROUND OF THE INVENTION

This invention relates to a battery pack containing a rechargeable cell and a protection circuit.

A battery pack containing a protection circuit has been developed (Japanese Non-examined Patent Publication HEI 8-329913, 1996). As shown in FIG. 1, the battery pack disclosed in this patent application contains a prismatic battery 1016, which is a lithium ion rechargeable cell, and a protection circuit 103. The protection circuit 103 detects battery current and voltage and controls the system to avoid use of the battery under abnormal conditions. The protection circuit 103 prevents battery over-charge and over-discharge, or controls the system to avoid extremely large current flow through the battery. To control current flow through the battery, the protection circuit 103 utilizes a switching device such as a field effect transistor (FET) connected in series with the battery. The switching device is controlled by a control circuit. The control circuit detects battery voltage or current and controls the switching device on or off. When the control circuit turns the switching device off, current flow through the battery is cut-off.

The battery pack shown in FIG. 1 has a surface mounted protection circuit 103 on a printed circuit board 1017 disposed between the prismatic battery 1016 and a case 101. The printed circuit board 1017 has a large number of electronic parts attached to implement the switching device and the control circuit to turn that switching device on and off. Further, insulating paper 1018 is disposed on both sides of the printed circuit board 1017 to insulate the electronic parts attached to the printed circuit board 1017.

Since the switching device and control circuit are mounted on the surface of the printed circuit board of the battery pack shown in FIG. 1, the protection circuit can fail to function properly due to the electrolyte leaking from the battery. This is because the electrolyte can cause corrosion of metal regions attached to the printed circuit board surface, or cause short circuits between conducting regions due to migration or dendrite growth. Since the protection circuit protects the battery against use in abnormal circumstances, it is critical for the protection circuit to function properly in the abnormal situation when the electrolyte leaks from the battery. Therefore, it is important for the protection circuit to reliably protect the battery even when the electrolyte leaks from the battery.

In addition, moisture ingress can occur during battery use. Similar to electrolyte leakage, moisture ingress can adversely affect the protection circuit's electronic parts, or corrode metal regions to interfere with proper functioning of the protection circuit. This drawback can be eliminated by making the battery pack case a completely hermetic structure. However, a completely hermetic structure cannot be made because of the requirement to expose terminals, such as the electrode terminals outside the battery pack case. Therefore, how to have a proper functioning protection circuit when moisture ingress occurs is extremely important.

Further, it is extremely difficult to make a battery pack, which has a switching device and protection circuit surface mounted on a printed circuit board, with a structure sufficiently resistant to vibration. This is because when the battery pack is vibrated, the electronic parts of the switching device and the protection circuit that are connected to the printed circuit board are also vibrated. Since electronic parts are attached to conducting layers on the surface of the printed circuit board, there is also the drawback that vibration can easily delaminate conducting layers. Consequently, it is possible for the electronic parts of the protection circuit that are surface mounted to a printed circuit board to become damaged or disconnected in a battery pack, which is assembled by a method that imparts vibration such as ultra-sonic welding of the case.

Still further, because prior art battery packs have large protection circuits, restrictions are placed on the location of parts within the case. For this reason, parts cannot always be located in ideal locations. For example, it may not be possible to place the protection circuit at its closest position to the connecting parts. Consequently, drawbacks may include a need for long protection circuit connecting leads.

The present invention was developed to eliminate these types of drawbacks observed in prior art battery packs. Thus, it is an important object of the present invention to provide a battery pack, which drastically reduces protection circuit malfunction generated by battery electrolyte leakage and moisture ingress, and which has a structure of superior resistance to vibration.

Another important object of the present invention is to provide a battery pack in which the protection circuit can be made extremely compact and can be freely located within a case with a water resistant, vibration resistant, and insulating structure.

The above and further objects and features of the invention will more fully be apparent from the following detailed description with accompanying drawings.

SUMMARY OF THE INVENTION

The battery pack of the present invention has a case containing a rechargeable cell along with a protection circuit provided with a switching device, which is connected in series with the rechargeable cell and controls current flowing through the battery, and a control circuit, which detects battery voltage, or current, or both, and controls the switching device. The protection circuit, provided with a switching device and a control circuit, is molded with insulating material into a single package as a one-package unit. The one-package unit is disposed in a space provided in an insulating holder. The one-package unit, the insulating holder, and the battery are housed within the case.

A battery pack with this structure drastically reduces protection circuit malfunction caused by battery leakage or moisture ingress. This is because the protection circuit, provided with a switching device, which controls current through the battery, and a control circuit, which controls the switching device, is molded with insulating material into a single package, and housed along with the rechargeable cell in the battery pack case. Since the protection circuit is molded with insulating material into a single package, introduction of an electrolyte leaked from the battery, or moisture into the protection circuit, can be effectively prevented in a battery pack of this configuration. Consequently, this type of battery pack drastically reduces protection circuit malfunction or failure due to battery leakage or moisture ingress, and the battery pack can be used reliably over a long period. Further, since the protection circuit is molded with insulating material, this type of battery pack reliably fixes the switching device and control circuit in specific locations, and attains a structure with superior resistance to vibration.

In addition, since the protection circuit, provided with a switching device and control circuit, is molded with insulating material into a single package, the protection circuit can be made extremely compact in a battery pack of this configuration. Consequently, this type of battery pack has the characteristic that the protection circuit has a water resistant, vibration resistant, insulating structure, and can be easily positioned without restriction within the case.

The rechargeable cell is preferably a prismatic lithium ion battery. The case is, for example, an ultra-sonically welded plastic case. The protection circuit is, for example, molded in epoxy resin.

The one-package unit is covered with insulating material on both the top and bottom, and one end of the one-package unit lead material is embedded within the package. Lead material from the one-package unit is connected to the rechargeable cell and to the battery pack electrode terminals.

The insulating holder provides space in an opening on the side facing the rechargeable cell, and the one-package unit can be disposed in this space.

The one-package unit can be to fixed to a printed circuit board, and lead material can be attached to the printed circuit board. This one-package unit can be inserted into the insulating holder while attached to the printed circuit board.

The one-package unit can be rectangular with surface electrodes B+, B−, and V− in corner regions of the bottom side. Surface electrodes B+ and B− for connection to the positive and negative sides of the rechargeable cell are preferably located at opposite ends of the one-package unit.

The battery pack can house, in its case, a thin outline battery as the rechargeable cell. Leads to connect the one-package unit with the rechargeable cell can be disposed along a side edge of the wide surface of the rechargeable cell. In the present patent application, a thin outline battery is taken to mean a battery having an external shape with thickness smaller than its width.

Finally, the battery pack can house, in its case, a thin outline battery as the rechargeable cell, and the one-package unit can be of rectangular shape. Lead material can be connected to the rectangular one-package unit projecting from its ends in the lengthwise direction. Lead material projecting from the ends of the one-package unit are connected to electrodes projecting from the rechargeable cell. The rectangular one-package unit is disposed parallel to the end of the long narrow rechargeable cell within the space provided by the insulating holder.

DETAILED DESCRIPTION OF THE INVENTION

Figure 1:
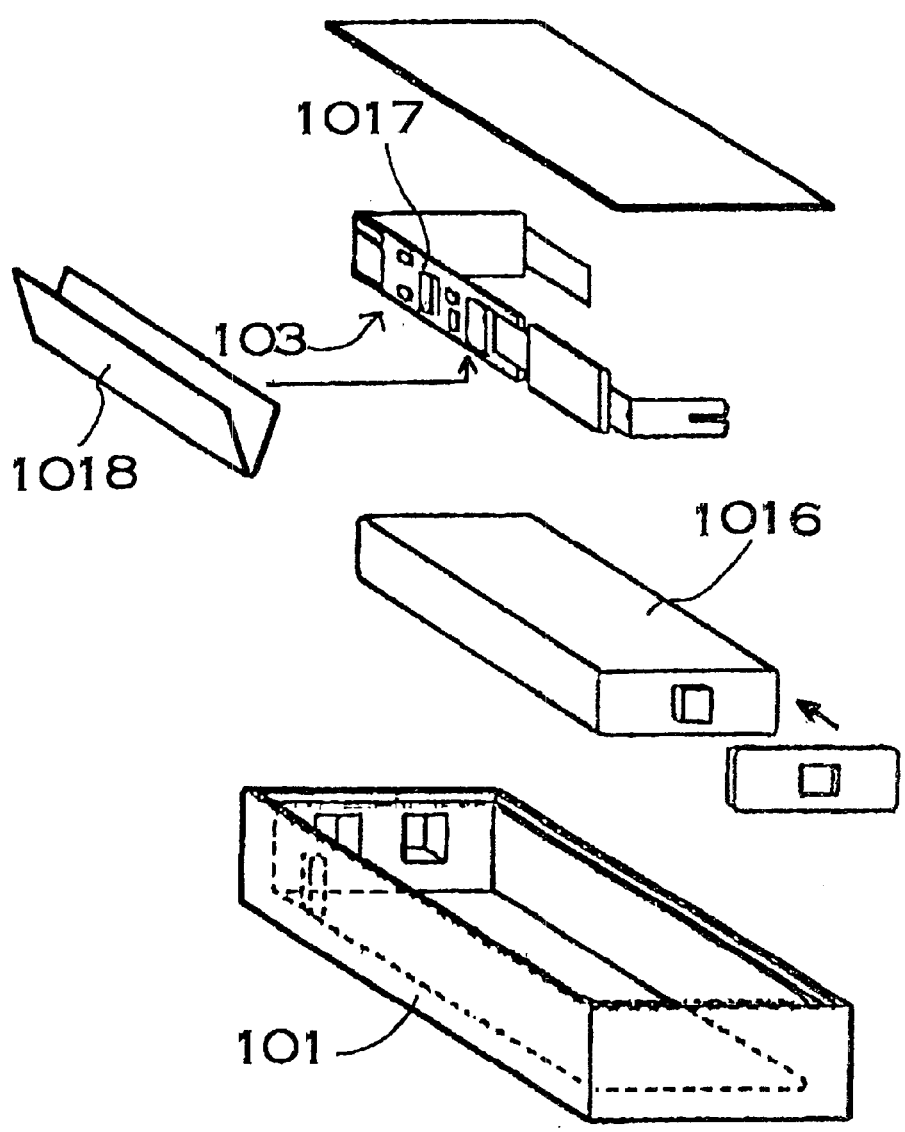
FIG. 1 is an exploded oblique view of a prior art battery pack.
Figure 2:
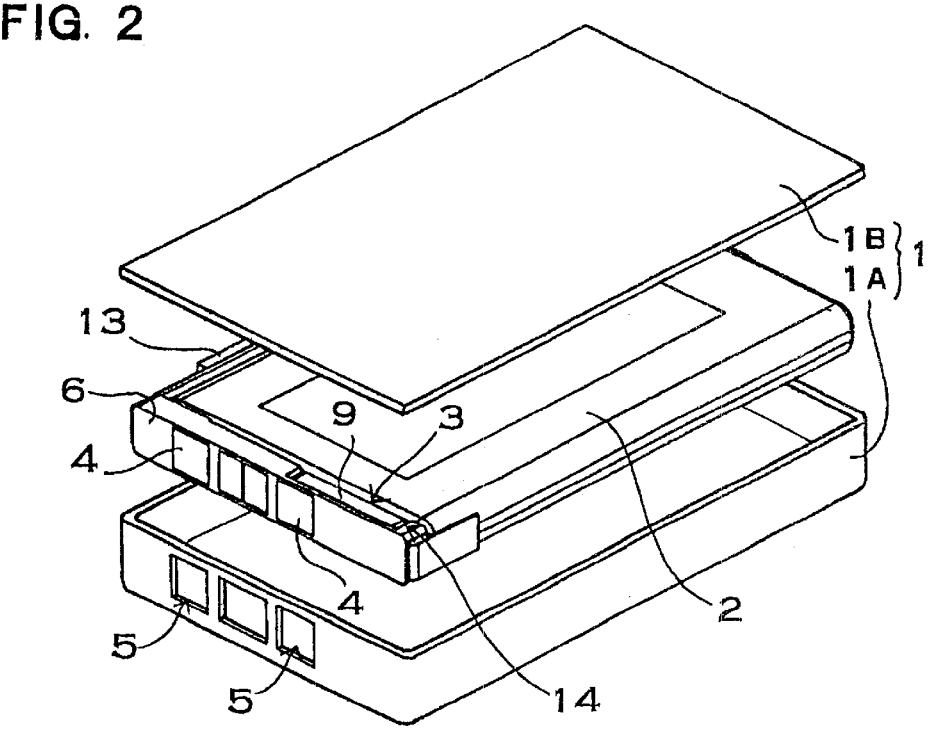
FIG. 2 is an exploded oblique view of an embodiment of the battery pack of the present invention.

Turning to the battery pack shown in the exploded oblique view of FIG. 2, a rechargeable cell 2 and a protection circuit 3 are contained in a case 1. The case 1 is made up of a lower case 1A and an upper case 1B, which are formed pieces of heat-pliable plastic. However, the battery pack of the present invention does not necessarily require the case to be formed plastic, and for example, the case may also be configured from heat-shrink film. The lower case 1A has a box shape and houses the battery 2 and the protection circuit 3. The lower case 1A also has electrode windows 5 for exposing electrode terminals 4 outside the case. Electrode terminals 4 fixed to an insulating holder 6 are disposed inside the electrode windows 5, and the electrode terminals 4 are exposed outside the case. With the rechargeable cell 2, the protection circuit 3, and the insulating holder 6 housed in the lower case 1A, the edges of the upper case 1B are ultrasonically welded along the edges of the lower case 1A opening.

The ultra-sonically welded case 1 allows strong connection of case pieces without using connecting materials, and fixes case 1 together in a manner that will not separate at the opening. This produces a high quality battery pack that can be inexpensively produced in quantity. However, the case may also be assembled using a bonded or pressure fitted configuration. Further, the case may also be a heat-shrink film structure encasing a connection of rechargeable cell, one-package unit, and insulating holder, rather than a formed plastic or metallic case.

The battery pack of FIG. 2 houses within the case 1, a prismatic lithium ion rechargeable cell as the rechargeable cell 2. However, the battery pack of the present invention does not restrict the rechargeable cell to a lithium ion rechargeable cell. The rechargeable cell may be a rechargeable cell type presently in use, such as a nickel cadmium battery or a nickel hydrogen battery, or it may also be a new type of rechargeable cell yet to be developed. Further, the rechargeable cell does not necessarily have to be a prismatic battery. The rechargeable cell may also be a battery shape such as a cylindrical battery or coin battery.

Figure 3:
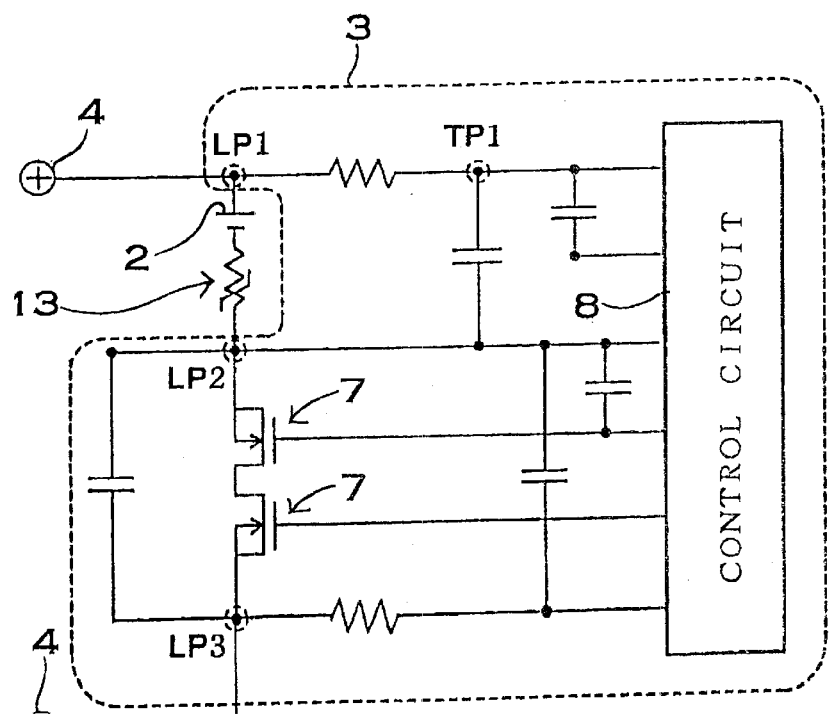
FIG. 3 is a circuit diagram of the protection circuit of an embodiment of the battery pack of the present invention.
Figure 4:
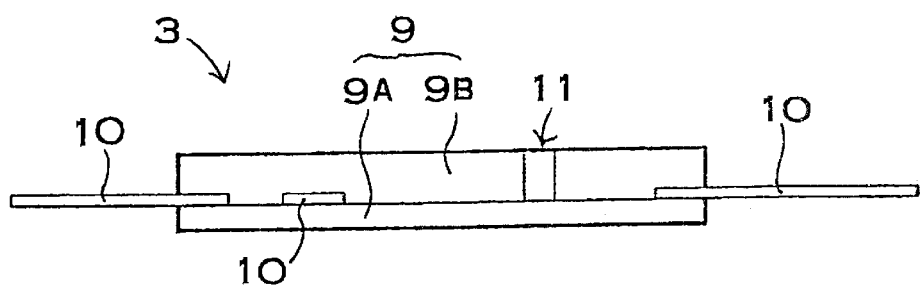
FIG. 4 is a front view of a one-package unit housed in an embodiment a battery pack of the present invention.

The protection circuit 3 is provided with switching devices connected in series with the rechargeable cell 2 to control current flow through the battery, and a control circuit to detect battery voltage, or current, or both, and to control the switching devices. A circuit diagram of the protection circuit 3 is shown in FIG. 3, and a front view is shown in FIG. 4. The protection circuit 3 of these figures is provided with FETs, which are the switching devices 7, and a control circuit 8 to control those FETs. Instead of FETs, devices such as bipolar transistors may also be used as the switching devices.

The switching devices 7 of the figures are an FET to control the charging state of the battery and an FET to control the discharging state, connected in series. The gates of the FETs are connected to the control circuit 8, and signals output from the control circuit 8 turn the FETs on and off. Under normal conditions, the protection circuit 8 puts both FETs in the on-state. If conditions become abnormal during battery charging, the FET controlling battery charging is turned off and charging current is cut-off. Likewise, if conditions become abnormal during battery discharge, the FET controlling battery discharge is turned off and discharge current is cut-off.

The control circuit 8 detects battery voltage and current flowing through the battery, and controls the switching devices 7. If battery voltage exceeds a preset maximum voltage during charging, the control circuit 8 outputs a signal to turn off the FET controlling charging to prevent battery overcharging. Likewise, to prevent battery over-discharge, the control circuit 8 outputs a signal to turn off the FET controlling discharge if battery voltage drops below a preset minimum voltage. In addition, if the battery pack output side is short circuited and excessive current flows through the battery, or if by mistake a high charging voltage is applied to the battery pack and excessive current flows, the control circuit 8 detects the excessive current and outputs a signal to turn off the switching devices 7.

The protection circuit 3 of FIG. 3 is made up of a pair of FETs, which are the switching devices 7, a control circuit 8, resistors, and capacitors. As shown in FIG. 4, electronic components such as these, which make up the protection circuit 3, are molded into a single package with insulating material to make a one-package unit 9. The insulating material is epoxy resin. Since the epoxy resin for molding the protection circuit 3 can harden at room temperature by mixing two liquids without applying heat, the one-package unit 9 can be efficiently produced in quantity. In the hardened state, the epoxy resin is sufficiently strong. Further, since epoxy resin has excellent insulating and moisture resistance properties, the protection circuit 3 can be molded in an ideal manner. However, instead of epoxy resin, materials such as urethane resin or silicone resin can also be used as the insulating material for molding the protection circuit.

Figure 5:
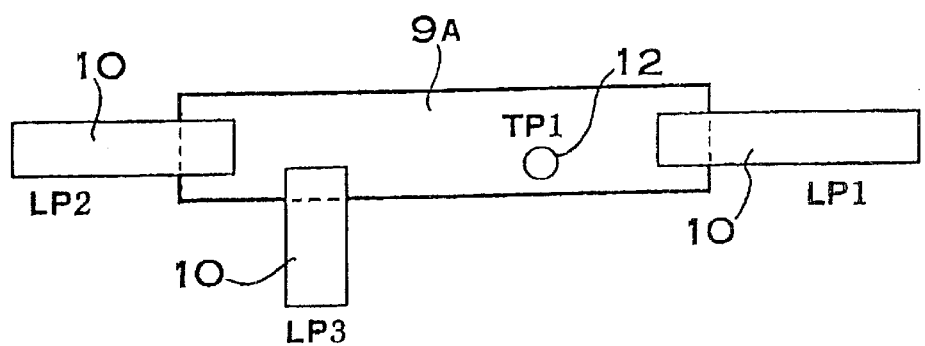
FIG. 5 is a plan view of an insulating substrate of the one-package unit shown in FIG. 4.

The one-package unit 9 shown in FIG. 4 contains the protection circuit 3 within a two layer laminated package of insulating material. In this one-package unit 9, an insulating surface layer 9B is laminate without gaps to tightly adhere to the upper surface of a bottom layer insulating substrate 9A. The FETs, control circuit integrated circuit (IC), resistors, and capacitors to realize the protection circuit are fixed to the insulating substrate 9A. In addition, as shown in the plan view of FIG. 5, lead material 10 is connected to the insulating substrate 9A.

Figure 6:
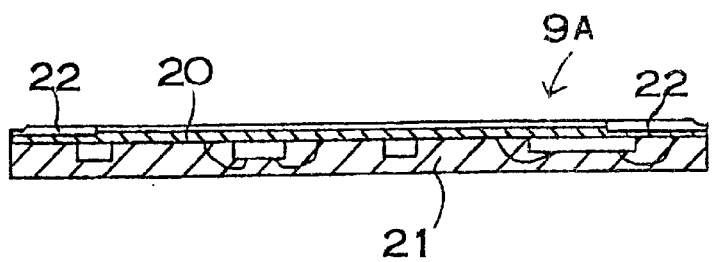
FIG. 6 is a cross-sectional view of an insulating substrate of the one-package unit shown in FIG. 4.

The internal structure of the insulating substrate 9A is shown in the cross-section view of FIG. 6. In the insulating substrate 9A shown in FIG. 6, electronic parts to implement the protection circuit including FETs, the control circuit IC, resistors and capacitors are mounted on the surface of substrate material such as glass epoxy resin or ceramic. That surface is then covered with insulating resin 21 to encase the electronic parts in the insulating resin 21. In FIG. 6, the upper surface of the insulating substrate 9A is provided with surface electrodes 22.

Lead material 10 is connected to surface electrodes 22 on the insulating substrate 9A, and an insulating surface layer 9B is laminated to the upper surface of the insulating substrate 9A without creating gaps. In the case when the insulating surface layer 9B is formed from plastic, lead material 10 can be connected to the insulating substrate 9A, and the insulating substrate 9A can be inserted in a plastic mold to fix the unit. The one-package unit 9 has the protection circuit 3 molded in a manner covering it above and below with insulating material, and embedding and fixing on end of the lead material 10 within the package. The insulating substrate 9A and the insulating surface layer 9B of the one-package unit 9 may be the same insulating material or different insulating material.

The one-package unit 9 shown in FIG. 4 is also provided with a test-point hole 11 in its insulating surface layer 9B. The test-point hole 11 is opened at a position allowing the test-point 12 on the protection circuit 3 attached to the upper surface of the insulating substrate 9A to be contacted. During test of the protection circuit 3, a connecting pin is inserted into the test-point hole 11 to contact the test-point 12. Normally the test-point hole 11 is sealed closed by a removable seal or filler material.

Figure 7:
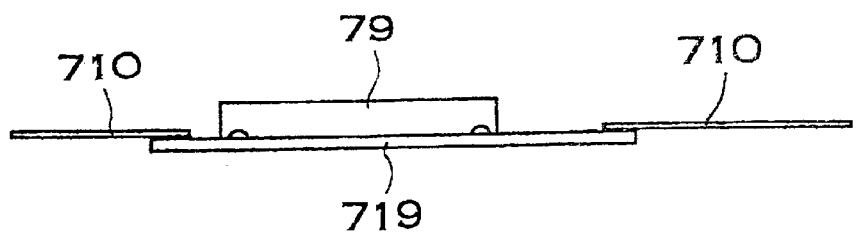
FIG. 7 is a front view showing another embodiment of a one-package unit.
Figure 8:
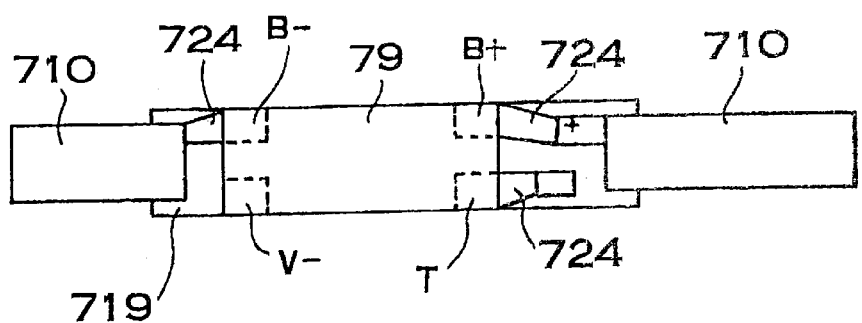
FIG. 8 is a plan view of the one-package unit shown in FIG. 7.
Figure 9:
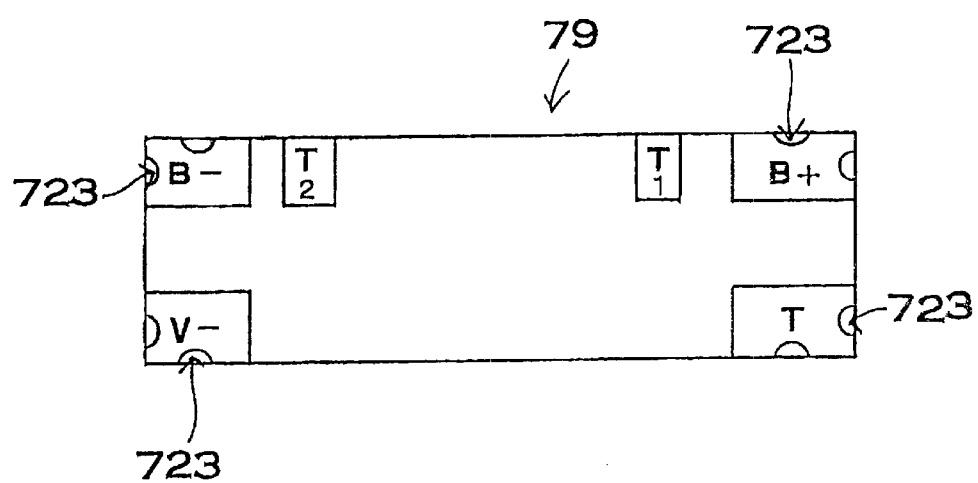
FIG. 9 is a plan view of an insulating substrate of the one-package unit shown in FIG. 7.

As shown in FIGS. 7 and 8, the one-package unit can also be connected to a printed circuit board 719, and lead material 710 can be connected. FIG. 9 shows a bottom view of a one-package unit 79 for mounting on a printed circuit board 719. The one-package unit 79 shown in FIG. 9 has an overall rectangular shape and has surface electrodes disposed in the four corners of the bottom surface. The corner region surface electrodes may be disposed on two sides, as shown in FIG. 9, or they may be disposed on one side (not illustrated). This type of one-package unit 79 enables confirmation of proper connection of the surface electrodes to the printed circuit board 719 with the one-package unit 79 being soldered to the printed circuit board 719. Further, as shown in FIG. 9, cut-outs 723 are provided on the edge of the sides of the surface electrodes. Cut-outs 723 allow even more precise confirmation of the connection between the surface electrodes and the printed circuit board 719.

In the one-package unit 79 shown in FIG. 9, surface electrodes B+ and B−, which connect with the positive and negative sides of the rechargeable cell, are disposed at opposite ends. Since the one-package unit 79 can widely separate the B+ and B− surface electrodes, the battery pack effectively prevents positive to negative battery short circuits. In the one-package unit 79 of FIG. 9, the B+ and B− surface electrodes are disposed in the upper corners, and the B− surface electrode and the V− surface electrode, which connects to a battery pack electrode terminal, are disposed on the left side corners. In a one-package unit 79 with this configuration, the B− surface electrode and the V− surface electrode can be connected with minimum wire length to reduce resistance between those electrodes.

Further, the one-package unit 79 shown in FIG. 9 has two test-point surface electrodes T1 and T2 disposed on the surface electrode side upper edge. Surface electrode T1, which is a test-point that connects to surface electrode B+ via a resistor, is disposed near the B+ surface electrode, and surface electrode T2, which is a test-point that connects to surface electrode V− via a resistor, is disposed near the B− surface electrode. This configuration of one-package unit 79 can reduce protection circuit malfunction when moisture has entered the battery pack. This is because short circuit current through surface electrodes B+, B−, and V− can be prevented via the test-point surface electrodes T1 and T2.

As shown in the plan view of FIG. 8, the one-package unit 79 is soldered to the surface of the printed circuit board 719.

For example, the one package unit 79 is re-flow soldered for connection to the printed circuit board 719. Conducting film 724 is fixed to one side of the printed circuit board 719. Surface electrodes of the one-package unit 79 are connected to the printed circuit board 719 conducting film 724, and lead material 710 is also soldered to the conducting film 724. The printed circuit board 719 structure with a one-package unit 79 and lead material 710 connected has the characteristic that lead material 710 can be joined to the one-package unit 79 with simple equipment.

Figure 10:
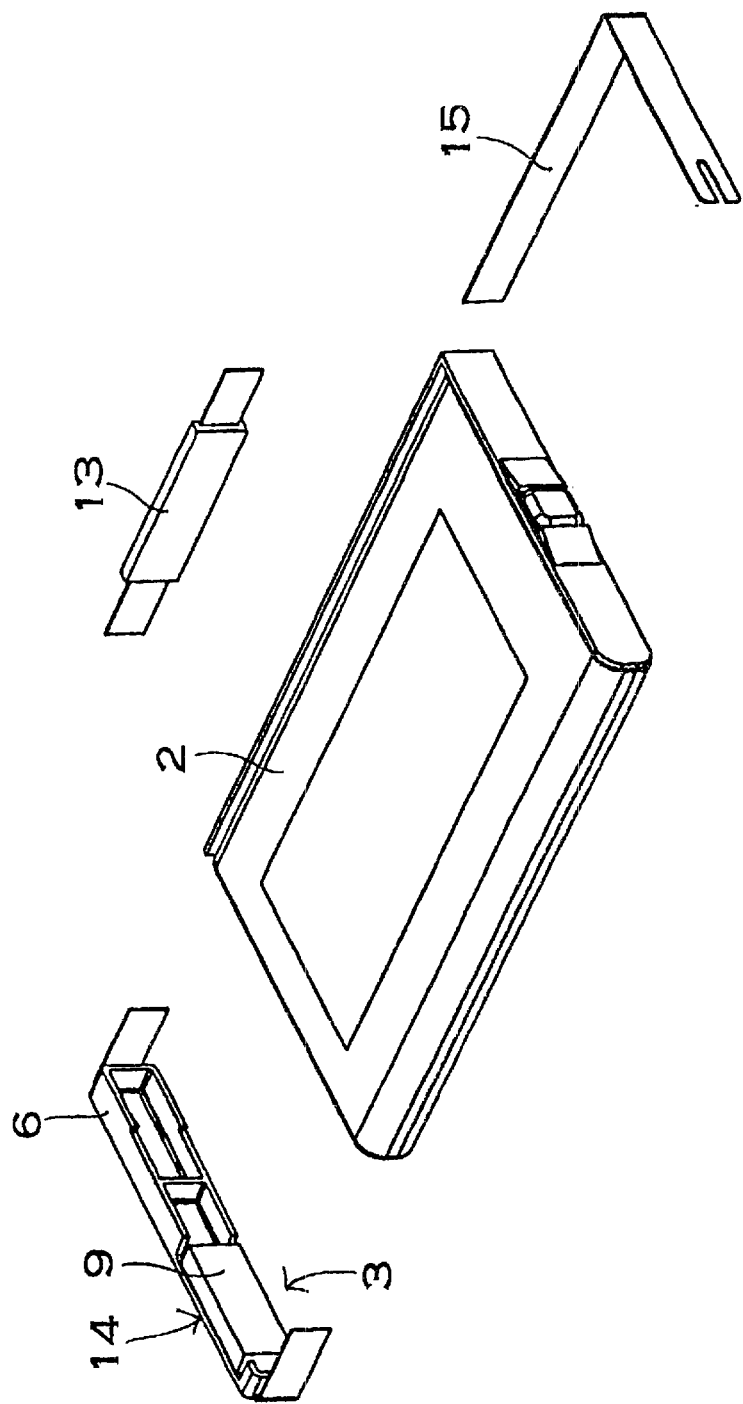
FIG. 10 is an exploded oblique view of the rechargeable cell and insulating holder of the battery pack shown in FIG. 2.
Figure 11:
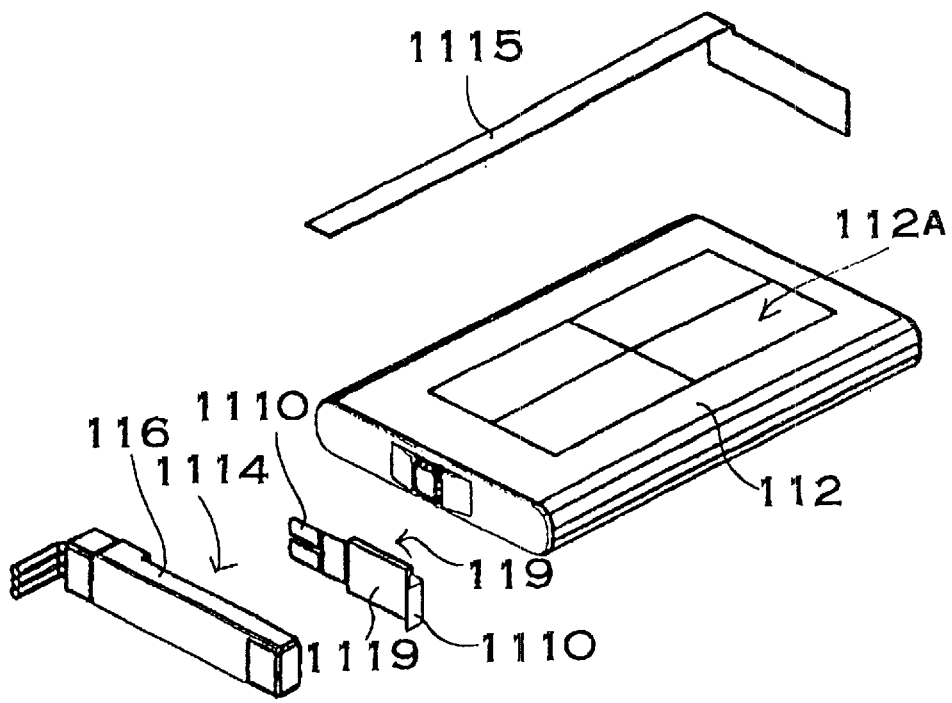
FIG. 11 is an exploded oblique view of another embodiment of the battery pack of the present invention.
Figure 12:
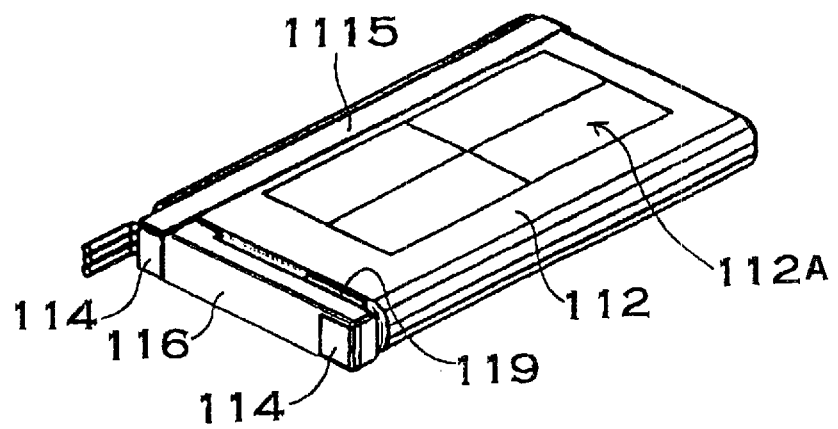
FIG. 12 is an oblique view showing the assembled appearance of the battery pack shown in FIG. 11.
Figure 13:
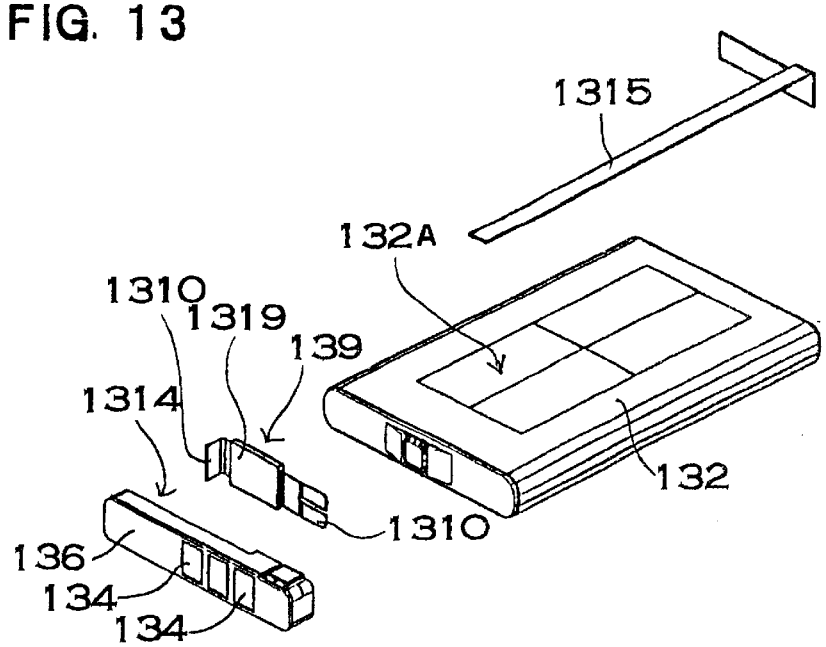
FIG. 13 is an exploded oblique view of another embodiment of the battery pack of the present invention.
Figure 14:
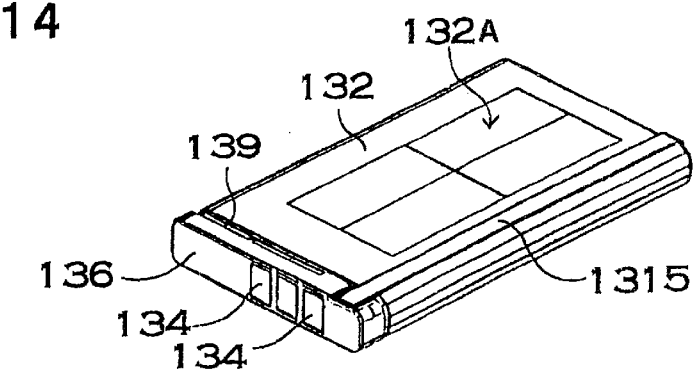
FIG. 14 is an oblique view showing the assembled appearance of the battery pack shown in FIG. 13.

The one-package unit 9 housing the protection circuit 3 is disposed within the case of the battery pack by means of the insulating holder 6. The one-package unit 9 is disposed inside the case via the insulating holder 6 in the configuration shown in FIG. 4 with embedded lead material 10, or in the configuration shown in FIG. 7 with one-package unit 79 and lead material 710 attachment to the printed circuit board 719. As shown in FIG. 10, the insulating holder 6 is a formed plastic piece provided with space 14 on its inside surface for holding a one-package unit 9 with no printed circuit board, or for holding a one-package unit attached to a printed circuit board. Electrode terminals 4 are embedded in the surface of the insulating holder 6.

In the insulating holder 6 shown in the figures, the one-package unit holding space 14 is established on the side facing the rechargeable cell 2. The holding space 14 opening is made to a size which retains the one-package unit 9 with almost no gaps. For the insulating holder 6 to retain the one-package unit 9 in a specified position of the holding space 14, the one-package unit 9 and holding space 14 are made in a snap-together or pressure-fit configuration, or the printed circuit board with a one-package unit attached and the holding space 14 are made in a snap-together configuration.

The battery pack shown in FIG. 2 has a rechargeable cell 2, which is a thin outline battery, contained in the case 1. The insulating holder 6 is disposed at one end of the rechargeable cell 2, and the one-package unit 9 is disposed between the insulating holder 6 and the rechargeable cell 2. The insulating holder 6 has a width approximately equal to the width of the rechargeable cell 2. The insulating holder 6 has electrode terminals 4 fixed to its front side and is provided with holding space 14 on its inside surface to contain the one-package unit with a configuration shown in FIG. 4 or FIG. 7. The insulating holder 6 is provided with side walls on both sides of its inside surface formed as a single piece with the insulating holder 6. One part of these side walls has cut-outs which establish the holding space 14 for housing the one-package unit 9.

However, the battery pack of the present invention may also be configured with the holding space for housing the one-package unit established inside the side walls provided on the insulating holder. In this type of insulating holder, the printed circuit board to which the one-package unit is attached closes off the holding space. Namely, the structure can be such that the one-package unit is inserted inside the holding space, and the printed circuit board closes the holding space opening.

The insulating holder 6 shown in the figures utilizes space adjacent to the projecting rechargeable cell 2 electrode as the holding space 14, and the one-package unit 9 is contained in that space. The one-package unit 9 contained here has lead material 10, which projects in the lengthwise direction from the ends of the rectangular shaped one-package unit 9, and connected to projecting rechargeable cell 2 electrodes. The rectangular shaped one-package unit 9 resides in the insulating holder 6 holding space 14 parallel to the end of the long narrow rechargeable cell 2. This configuration allows lead material 10 connected to the one-package unit 9 to connect with projecting rechargeable cell 2 electrodes over a short distance. This configuration allows the one-package unit 9 or the printed circuit board with the one-package unit attached to be reliably retained in a fixed position. In addition, since space adjacent to the projecting rechargeable cell 2 electrode can be efficiently used to house the one-package unit 9, the external size of the battery pack can be reduced because it can house the protection circuit 3.

In the battery packs shown in FIGS. 11 through 14, leads 1115, 1315 are disposed on the surface of the thin outline battery. In these figures, the one-package unit 119, 139 is fixed to a printed circuit board 1119, 1319 and mounted in the insulating holder 116, 136. Leads 1115, 1315 connecting the rechargeable cell 112, 132 and the one-package unit 119, 139 are located on the laterally extending wide surface 112A, 132A of the rechargeable cell 112, 132, and are disposed along the edge of that surface. One end of a lead 1115, 1315 is connected to the rechargeable cell 112, 132, and the other end is connected to the one-package unit 119, 139 or to the printed circuit board 1119, 1319. The lead 1115, 1315 is arranged in this position and retained within the case (not illustrated). This configuration of battery pack can house a lead 1115, 1315, and efficiently use the volume inside the case. This is because the laterally wide surface of a thin prismatic battery expands at the center when internal pressure becomes great. This creates a gap between the case and the rechargeable cell 112, 132, but a lead is disposed in this gap. The wide central portion of a rechargeable cell 112, 132 with high internal pressure expands, but the side edges do not expand. Since the lead 1115, 1315 is disposed along a side edge which does not expand, the case does not have to be made larger to accommodate the lead 1115, 1315. In these figures, 114, 154 are the electrode terminals, 1110, 1310 is the lead material, and 1114, 1514 is the holding space.

As shown in the circuit diagram of FIG. 3, the three pieces of lead material 10 connected to the one-package unit 9 connect to the positive side battery electrode terminal 4, a PTC device 13, and the negative side battery electrode terminal 4. The PTC device 13 is connected in series with the battery and is disposed in contact with the battery surface. The resistance of PTC device 13 rapidly increases when the battery temperature climbs to a prescribed temperature. Therefore, when the battery temperature becomes abnormally high, current flow becomes negligible and is effectively cut-off. Since this battery pack is doubly protected by both a PCT device 13 and a protection circuit 3, reliability is made even greater. A battery pack with a doubly protected battery can also contain a fuse instead of a PCT device. Further, a battery pack can contain a fuse, a PCT device, and a protection circuit. However, the battery pack of the present invention does not necessarily have to contain a device such as a PCT or a fuse in addition to the protection circuit.

A battery pack of this structure is assembled by the following steps.

(1) The one-package unit 9 containing the protection circuit 3 is set in the insulating holder 6 holding space 14.
(2) One-package unit 9 lead material 10 is connected to insulating holder 6 electrode terminal 4 by a method such as spot welding.
(3) The insulating holder 6 is mounted in a fixed position on the rechargeable cell 2, and the remaining one-package unit 9 lead material 10 is connected to the rechargeable cell 2 and the PCT device 13 by a method such as spot welding.

(4) The other PCT device 13 lead material is connected to the rechargeable cell 2 via a lead 15.

(5) The mutually connected rechargeable cell 2, insulating holder 6, and PCT device 13 are inserted into a fixed position in the lower case 1A.

(6) The upper case 1B is ultra-sonically welded, or joined by bonding, to the open region of the lower case 1A to connect the upper and lower parts of the case 1.

Figure 15:
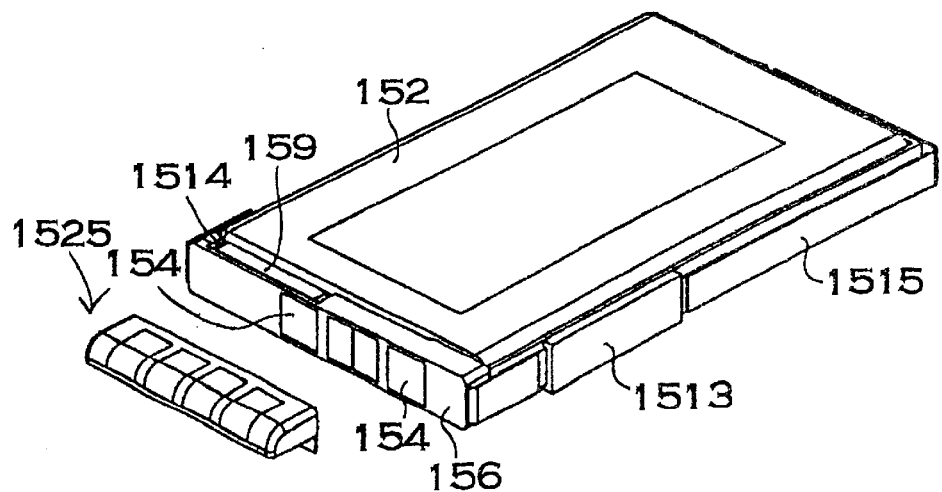
FIG. 15 is an exploded oblique view of another embodiment of the battery pack of the present invention.

Finally, as shown in FIG. 15, an electrode terminal holder 1525 may also be connected to the electrode terminals 154 of the insulating holder 156. In this battery pack, the electrode terminal holder 1525 connected to the electrode terminals 154 is changed among various formats to correspond to the type of electrical equipment the battery pack will be housed in. In this manner, a battery pack provided with an electrode terminal holder 1525 uses the same shaped insulating holder 156. Specifically, the connected rechargeable cell 152, one-package unit 159, and insulating holder 156 are treated as a single unit and only the electrode terminal holder 1525 is made to adapt to a plurality of types of electrical equipment. Thus, this battery pack has the feature that it can be produced in quantity extremely efficiently. This battery pack is assembled by attaching the electrode terminal holder 1525 to the insulating holder 156 electrode terminals 154 and then installing them in a fixed position in the case, or by installing the rechargeable cell, one-package unit, and insulating holder in a fixed position in the case and then connecting the electrode terminal holder to the insulating holder electrode terminals. In FIG. 15, 1513 is the PCT device, 1514 is the holding space, and 1515 is a lead.

In the battery pack embodiment described above, the rechargeable cell, one-package unit, and insulating holder are installed in a case, which is a formed plastic piece. A battery pack with a heat-shrink film case is assembled by covering the connected structure of one-package unit, insulating holder, and rechargeable cell with heat-shrink film. This battery pack can also be configured, for example, by providing electrode terminals on the insulating holder, or by extending leads outside without providing electrode terminals on the case, and joining the ends of the leads to connectors housing the electrode terminals.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims or equivalence of such meets and bounds thereof are therefore intended to be embraced by the claims.

What is claimed is:

1. A battery pack comprising:
    a rechargeable cell comprising a positive side and a negative side;
    a one-package unit comprising a rechargeable cell protection circuit and insulating material comprising an insulating substrate bottom and an upper surface insulating layer, said rechargeable cell protection circuit having,
        a switching device connected in series with said rechargeable cell to control current flow through said rechargeable cell, and
        a control circuit to detect rechargeable cell voltage or rechargeable cell current or both, and to control said switching device;
    a case to house said one-package circuit and said rechargeable cell;
    surface electrodes, which are connected to said positive and negative sides, disposed at ends of opposing sides of said one-package unit, respectively; and
    an insulating holder, which houses said one-package unit in a holding space, and retains said one-package unit in a specified position inside said case,
    wherein said insulating material laminates an upper and lower surface of said rechargeable cell protection circuit thereby containing said rechargeable cell protection circuit, and
    wherein said rechargeable cell protection circuit is sealed between said insulating substrate bottom layer and said upper surface insulating layer without gaps.

2. The battery pack as recited in claim 1, wherein said rechargeable cell is a prismatic lithium ion rechargeable cell.

3. The battery pack as recited in claim 1, wherein said case housing said one-package unit and said insulating holder is an ultrasonically welded plastic case.

4. The battery pack as recited in claim 1, wherein said one-package unit comprises said rechargeable cell protection circuit and an epoxy resin molded on said rechargeable cell protection circuit.

5. The battery pack as recited in claim 1, wherein said epoxy resin comprises two liquids capable of hardening when mixed together at room temperature.

6. The battery pack as recited in claim 1, wherein said insulating material comprises a silicone resin.

7. The battery pack as recited in claim 1, wherein said rechargeable cell protection circuit further comprises FETs, a control circuit IC, resistors, and capacitors, and
    wherein said rechargeable cell protection circuit is mounted on said bottom layer insulating substrate.

8. The battery pack as recited in claim 7, wherein said bottom layer insulating substrate comprises a glass epoxy resin and an insulating resin covers a surface thereof.

9. The battery pack as recited in claim 7, wherein said bottom layer insulating substrate comprises a ceramic material and an insulating resin covers a surface thereof.

10. The battery pack as recited in claim 1, further comprising lead material connected to said bottom layer insulating substrate.

11. The battery pack as recited in claim 1, wherein said upper surface insulating layer is formed of plastic, and said insulating substrate bottom layer covers a surface thereof.

12. The battery pack as recited in claim 1, wherein said insulating substrate bottom layer and said upper surface insulating layer comprise the same insulating material.

13. The battery pack as recited in claim 1, wherein said insulating substrate bottom layer comprises a first insulating material and said upper surface insulating layer comprises a second insulating material that is different from said first insulating material.

14. The battery pack as recited in claim 1, wherein said upper surface insulating layer has a test-point hole provided therein.

15. The battery pack as recited in claim 14, wherein said rechargeable cell protection circuit further comprises a test-point, and
    wherein said test-point hole is positioned at a location of said test-point.

16. The battery pack as recited in claim 14, further comprising a removable seal or filler material disposed in said test-point hole so as to fill said test-point hole.

17. The battery pack as recited in claim 14, wherein said one-package unit further comprises:

a first test-point surface electrode;

a B+ surface electrode;

a first resistor disposed near the B+ surface electrode;

a second test-point surface electrode;

a V− surface electrode;

a second resistor; and a B− surface electrode, wherein said first test-point surface electrode is electrically connected to said B+ surface electrode via said first resistor, and wherein said second test-point surface electrode is electrically connected to said B− surface electrode via said second resistor.

18. The battery pack as recited in claim 1, wherein said insulating holder is provided next to said rechargeable cell, wherein said holding space is located on a side of said insulating holder that faces said rechargeable cell, and wherein said insulating holder is disposed at an end of said rechargeable cell.

19. The battery pack as recited in claim 1, further comprising:

a printed circuit board; and lead material, wherein said one-package unit is mounted on said printed circuit board, wherein said lead material is joined to said printed circuit board, and wherein said one-package unit and said printed circuit board are attached to said insulating holder.

20. The battery pack as recited in claim 1, further comprising a lead for connecting said one-package unit to said rechargeable cell;

wherein said rechargeable cell is a thin outline battery, and wherein said lead is disposed along a side edge of a wide surface of said thin outline battery.

21. The battery pack as recited in claim 1, further comprising:

lead material; and electrodes projecting from said rechargeable cell, wherein said rechargeable cell comprises a thin outline battery, wherein said one-package unit has a rectangular shape, wherein said lead material is joined to said one-package unit so as to protrude lengthwise from ends of said one-package unit, wherein said lead material extending from the ends of said one-package unit connects with said rechargeable cell electrodes, and wherein said rectangular shaped one-package unit is disposed in said holding space of said insulating holder in a manner orienting said one-package unit parallel to an end of said rechargeable cell.

22. A battery pack comprising:

a rechargeable cell;

a rectangularly shaped one-package unit having a top and bottom surface and comprising a rechargeable cell protection circuit and insulating material, said rechargeable cell protection circuit having, a switching device connected in series with said rechargeable cell to control current flow through said rechargeable cell, and a control circuit to detect rechargeable cell voltage or rechargeable cell current or both, and to control said switching device;

a case to house said one-package circuit and said rechargeable cell;

surface electrodes and an insulating holder, which houses said one-package unit in a holding space, and retains said one-package unit in a specified position inside said case, wherein said insulating material laminates an upper and lower surface of said rechargeable cell protection circuit thereby containing said rechargeable cell protection circuit, wherein said one-package unit further comprises surface electrodes, and wherein said one-package unit is rectangular shaped with a top and bottom surface.

* * * * *